(12) United States Patent
Yamamoto et al.

(10) Patent No.: US 10,374,539 B2
(45) Date of Patent: Aug. 6, 2019

(54) DRIVING DEVICE

(71) Applicant: TOYOTA JIDOSHA KABUSHIKI KAISHA, Toyota-shi, Aichi-ken (JP)

(72) Inventors: Toshihiro Yamamoto, Toyohashi (JP); Kenji Yamada, Komaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/907,596

(22) Filed: Feb. 28, 2018

(65) Prior Publication Data

US 2018/0254730 A1 Sep. 6, 2018

(30) Foreign Application Priority Data

Mar. 6, 2017 (JP) ................................. 2017-041788

(51) Int. Cl.
  *H02P 21/00* (2016.01)
  *H02P 21/13* (2006.01)
  *B60L 15/00* (2006.01)
  *B60L 15/08* (2006.01)
  *H02P 21/22* (2016.01)
  *H02P 27/12* (2006.01)
  *H02P 21/14* (2016.01)
  *H02P 29/50* (2016.01)
  *B60L 50/50* (2019.01)

(52) U.S. Cl.
  CPC ............ *H02P 21/13* (2013.01); *B60L 15/007* (2013.01); *B60L 15/08* (2013.01); *H02P 21/0003* (2013.01); *H02P 21/14* (2013.01); *H02P 21/22* (2016.02); *H02P 27/12* (2013.01); *H02P 29/50* (2016.02); *B60L 50/50* (2019.02); *B60L 2210/42* (2013.01); *Y02T 10/644* (2013.01); *Y02T 10/7225* (2013.01); *Y02T 10/7241* (2013.01)

(58) Field of Classification Search
  CPC .......................... H02M 1/12; H02M 2001/123
  See application file for complete search history.

(56) References Cited

U.S. PATENT DOCUMENTS

2009/0224720 A1* 9/2009 Oyobe .................... B60L 11/18
  318/801

FOREIGN PATENT DOCUMENTS

| JP | 2006-174645 A | 6/2006 |
| JP | 2014-230472 A | 12/2014 |
| JP | 2016-005370 A | 1/2016 |

* cited by examiner

*Primary Examiner* — Karen Masih
(74) *Attorney, Agent, or Firm* — Sughrue Mion, PLLC

(57) ABSTRACT

A driving device includes a motor, an inverter configured to drive the motor by switching a plurality of switching elements, and an electronic control unit configured to set voltage commands of phases according to temporary voltage commands of the phases based on a torque command of the motor and perform switching control of the switching elements by generating PWM signals for the switching elements by using the voltage commands of the phases and a carrier voltage. The electronic control unit is configured to switch a method of setting the voltage commands between a first method and a second method for each irregular time interval. The first method is a method of setting the voltage commands without superposing harmonics to the temporary voltage commands, and the second method is a method of setting the voltage commands by superposing the harmonics to the temporary voltage command.

11 Claims, 9 Drawing Sheets

FIG. 7

| NUMBER k | CONTINUOUS TIME THRESHOLD Cref |
|---|---|
| 1 | 60 |
| 2 | 5 |
| 3 | 6 |
| 4 | 45 |
| 5 | 23 |
| . | . |
| . | . |
| . | . |

DRIVING DEVICE

INCORPORATION BY REFERENCE

The disclosure of Japanese Patent Application No. 2017-041788 filed on Mar. 6, 2017 including the specification, drawings and abstract is incorporated herein by reference in its entirety.

BACKGROUND

1. Technical Field

The disclosure relates to a driving device, and particularly, to a driving device that includes a motor and an inverter.

2. Description of Related Art

As a driving device according to the related art, there has been suggested a driving device that includes an electric motor, and an inverter device that supplies power to the electric motor by converting direct current power from a power source into three-phase alternating current power (for example, see Japanese Unexamined Patent Application Publication No. 2006-174645 (JP 2006-174645 A)). In the driving device, the inverter device is controlled by generating pulse-width modulation (PWM) pulses according to modulation waves and carrier waves. Further, in the driving device, the sum of a fundamental carrier frequency and spread frequencies of which an average value is approximately zero is used as a carrier frequency. In the driving device, the carrier frequency spreads in this manner, and thus, it is possible to reduce noise caused by electromagnetic sound.

SUMMARY

In the above-described driving device, there is a demand for reduction of the noise caused by the electromagnetic sound by a new method other than a method of spreading the carrier frequency. For example, when synchronous PWM control is performed, since the carrier frequency is not able to irregularly spread, the construction of a new method is needed.

The present disclosure provides a driving device that further reduces noise caused by electromagnetic sound.

An aspect of the present disclosure relates to a driving device. The driving device includes a motor, an inverter configured to drive the motor by switching a plurality of switching elements, and an electronic control unit configured to set voltage commands of phases according to temporary voltage commands of the phases based on a torque command of the motor and perform switching control on the switching elements by generating PWM signals for the switching elements by using the voltage commands of the phases and a carrier voltage. The electronic control unit is configured to switch a method of setting the voltage commands between a first method and a second method for each irregular time interval. The first method is a method of setting the voltage commands without superposing harmonics to the temporary voltage commands. The second method is a method of setting the voltage commands by superposing the harmonics to the temporary voltage commands.

In the driving device according to the aspect of the present disclosure, the voltage commands of the phases are set according to the temporary voltage commands of the phases based on the torque command of the motor, and the switching control of the switching elements is performed by generating the PWM signals for the switching elements by using the voltage commands of the phases and the carrier voltage. In this case, the method of setting the voltage commands is switched between the first method of setting the voltage commands without superposing the harmonics to the temporary voltage commands and the second method of setting the voltage commands by superposing the harmonics to the temporary voltage commands for each irregular time interval. The method of setting the voltage commands is switched between the first method and the second method, and thus, the timings of when the switching elements are turned on and off can vary. Accordingly, current harmonics to be contained (frequency (frequency order) having a high content in current harmonics) can vary. Accordingly, the method of setting the voltage commands is switched between the first method and the second method for each irregular time interval, and thus, the current harmonics to be contained can vary (spread) for each irregular time interval. As a result, it is possible to further reduce noise caused by electromagnetic sound. The method of setting the voltage commands can be switched through any of synchronous PWM control and asynchronous PWM control.

In the driving device according to the aspect of the present disclosure, an order of the harmonics may be a multiple of three. In the driving device according to the aspect of the present disclosure, an order of the harmonics may be constant or variable. In the driving device according to the aspect of the present disclosure, an amplitude of the harmonics may be constant or variable. In the driving device according to the aspect of the present disclosure, a relationship between a phase of the temporary voltage command and a phase of the harmonics may be constant or variable. When the order of the harmonics is variable, the amplitude of the harmonics is variable, or the relationship between the phase of the temporary voltage commands and the phase of the harmonics is variable, the current harmonics to be contained can further spread.

In the driving device according to the aspect of the present disclosure, the electronic control unit may be configured to switch the method of setting the voltage commands whenever a continuous time in the first method or the second method of the method of setting the voltage commands is equal to or greater than a threshold. The electronic control unit may be configured to switch the method of setting the voltage commands for each irregular time interval by updating the threshold with an irregular value.

In the driving device according to the aspect of the present disclosure, the electronic control unit may have a table for determining a threshold of the continuous time, and a number and the threshold of the continuous time may be set in the table. The electronic control unit may be configured to count the number whenever the continuous time in the first method or the second method is equal to or greater than the threshold and set the threshold of the continuous time corresponding to the number in the table as a new continuous time threshold.

In the driving device according to the aspect of the present disclosure, the electronic control unit may be configured to set a new continuous time threshold by using a random number generator whenever the continuous time in the first method or the second method is equal to or greater than the threshold.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is an explanatory diagram showing an example of a continuous time threshold table;

DETAILED DESCRIPTION OF EMBODIMENTS

A mode for carrying out the present disclosure will be described in conjunction with an embodiment.

Figure 1:
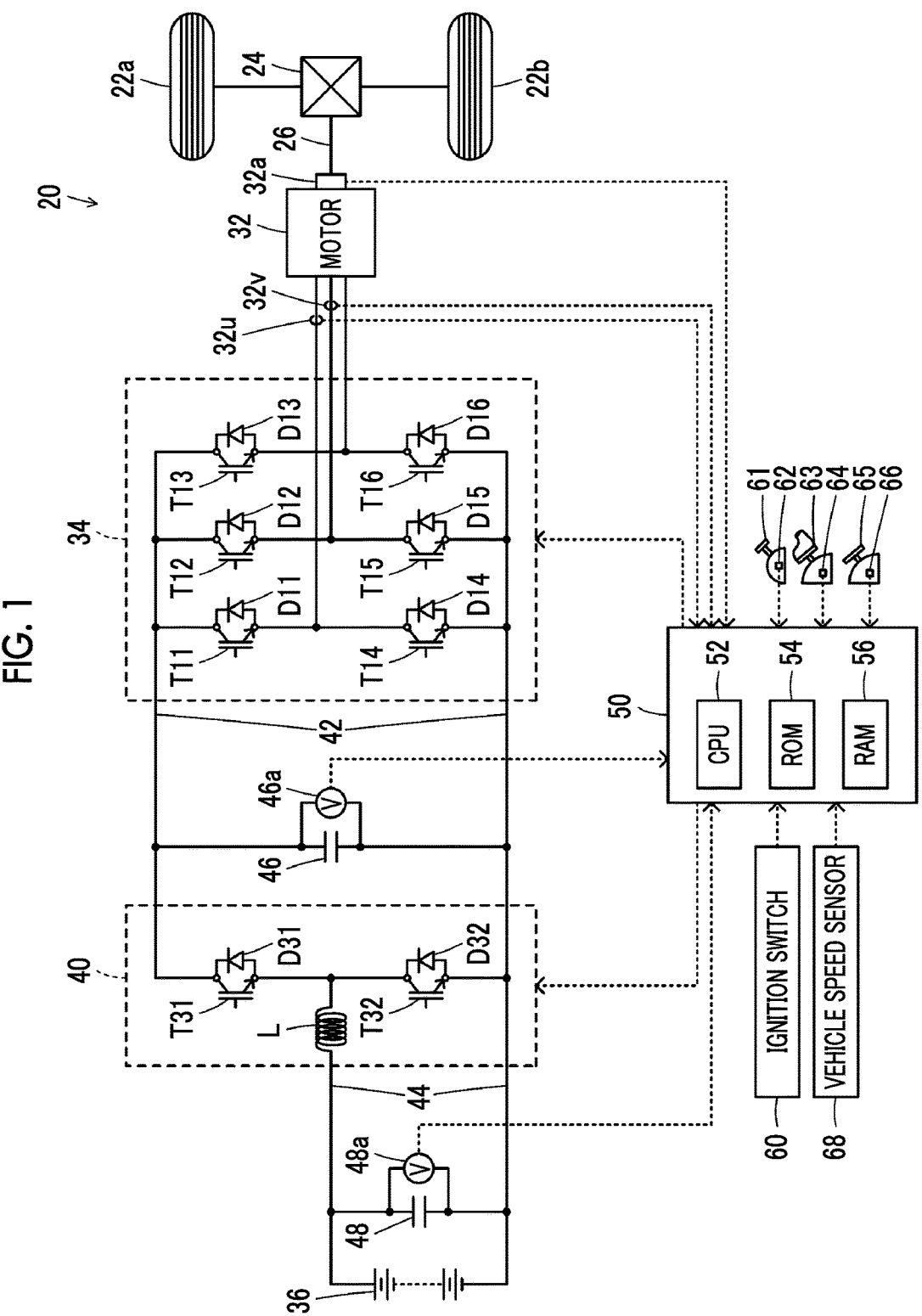
FIG. 1 is a schematic configuration diagram showing a configuration of an electric vehicle provided with a driving device as an embodiment of the present disclosure.

FIG. 1 is a schematic configuration diagram showing a configuration of an electric vehicle 20 provided with a driving device as an embodiment of the present disclosure. As shown in this diagram, the electric vehicle 20 according to the embodiment includes a motor 32, an inverter 34, a battery 36, a boost converter 40, and an electronic control unit 50.

The motor 32 is a synchronous motor generator, and includes a rotor in which a permanent magnet is embedded and a stator around which three-phase coils are wound. The rotor of the motor 32 is connected to a drive shaft 26 connected to drive wheels 22a, 22b through a differential gear 24.

The inverter 34 is used for driving the motor 32. The inverter 34 is connected to the boost converter 40 through a high voltage side power line 42, and includes six transistors T11 to T16 and six diodes D11 to D16 which are respectively connected to the six transistors T11 to T16 in parallel. The transistors T11 to T16 are paired such that sources and sinks thereof are connected to a positive electrode side line and a negative electrode side line of the high voltage side power line 42. Three-phase (U-phase, V-phase, and W-phase) coils of the motor 32 are respectively connected to connection points between the paired transistors of the transistors T11 to T16. Accordingly, when a voltage is applied to the inverter 34, the ratio of the ON time between the paired transistors of the transistors T11 to T16 is adjusted by the electronic control unit 50, and thus, a rotating magnetic field is produced with the three-phase coils. Therefore, the motor 32 is driven so as to be rotated. A smoothing capacitor 46 is attached to the positive electrode side line and the negative electrode side line of the high voltage side power line 42.

For example, the battery 36 is a lithium-ion secondary battery or a nickel-hydrogen secondary battery, and is connected to the boost converter 40 through a low voltage side power line 44. A smoothing capacitor 48 is attached to a positive electrode side line and a negative electrode side line of the low voltage side power line 44.

The boost converter 40 is connected to the high voltage side power line 42 and the low voltage side power line 44, and includes two transistors T31, T32, two diodes D31, D32 which are respectively connected to the two transistors T31, T32 in parallel, and a reactor L. The transistor T31 is connected to the positive electrode side line of the high voltage side power line 42. The transistor T32 is connected to the transistor T31 and the negative electrode side lines of the high voltage side power line 42 and the low voltage side power line 44. The reactor L is connected to a connection point between the transistors T31, T32 and the positive electrode side line of the low voltage side power line 44. The ratio of the ON time between the transistors T31, T32 is adjusted by the electronic control unit 50, and thus, the boost converter 40 supplies power to the high voltage side power line 42 by increasing the power of the low voltage side power line 44 or supplies power to the low voltage side power line 44 by decreasing the power of the high voltage side power line 42.

The electronic control unit 50 is a microprocessor which mainly incorporates a CPU 52, and includes a ROM 54 that stores a processing program, a RAM 56 that temporarily stores data, and input and output ports in addition to the CPU 52. Signals from various sensors are input to the electronic control unit 50 through the input port. For example, examples of the signals to be input to the electronic control unit 50 may include a rotation position θm from a rotation position detection sensor (for example, resolver) 32a that detects a rotation position of the rotor of the motor 32 and phase currents Iu, Iv from current sensors 32u, 32v that detects currents flowing in the phases of the motor 32. Examples of the signals to be input to the electronic control unit may also include a voltage Vb from a voltage sensor (not shown) attached between terminals of the battery 36 and a current Ib from a current sensor (not shown) attached to an output terminal of the battery 36. Examples of the signals to be input to the electronic control unit may also include a voltage VH of the capacitor 46 (high voltage side power line 42) from a voltage sensor 46a attached between terminals of the capacitor 46 and a voltage VL of the capacitor 48 (low voltage side power line 44) from a voltage sensor 48a attached between terminals of the capacitor 48. Examples of the signals to be input to the electronic control unit may also include an ignition signal from an ignition switch 60 and a shift position SP from a shift position sensor 62 that detects an operation position of a shift lever 61. Examples of the signals to be input to the electronic control unit may also include an accelerator operation amount Acc from an accelerator pedal position sensor 64 that detects the stepped amount of an accelerator pedal 63, a brake pedal position BP from a brake pedal position sensor 66 that detects the stepped amount of a brake pedal 65, and a vehicle speed V from a vehicle speed sensor 68. Various control signals are output from the electronic control unit 50 through the output port. Examples of the signals to be output from the electronic control unit 50 may include switching control signals of the inverter 34 for the transistors T11 to T16 and switching control signals of the boost converter 40 for the transistors T31, T32. The electronic control unit 50 calculates an electrical angle θe or the number of rotations Nm of the motor 32 based on the rotation position θm of the rotor of the motor 32 from the rotation position detection sensor 32a. The electronic control unit 50 calculates power storage ratio SOC of the battery 36 based on an integrated value of the current Ib of the battery 36 from the current sensor (not shown). The power storage ratio SOC is a ratio of the capacity of power capable of being discharged from the battery 36 to the total capacity of the battery 36.

In the electric vehicle 20 according to the embodiment having the above-described configuration, the electronic control unit 50 performs the following cruise control. In the cruise control, the electronic control unit sets a requested torque Td* requested by the drive shaft 26 based on the accelerator operation amount Acc and the vehicle speed V, sets the set requested torque Td* as a torque command Tm* of the motor 32, and performs switching control of the inverter 34 for the transistors T11 to T16 such that the motor 32 is driven according to the torque command Tm*. In the embodiment, the switching control of the inverter 34 for the transistors T11 to T16 is performed by pulse-width modulation control (PWM control). The PWM control is control for switching the transistors T11 to T16 by generating PWM signals for the transistors T11 to T16 by using voltage commands Vu*, Vv*, Vw* of the phases of the motor 32 and a carrier voltage (triangular wave voltage). In the cruise control, the electronic control unit sets a target voltage VH* of the high voltage side power line 42 such that the motor 32 is driven according to the torque command Tm*, and performs the switching control of the boost converter 40 for the transistors T31, T32 such that the voltage VH of the high voltage side power line 42 becomes the target voltage VH*.

Figure 2:
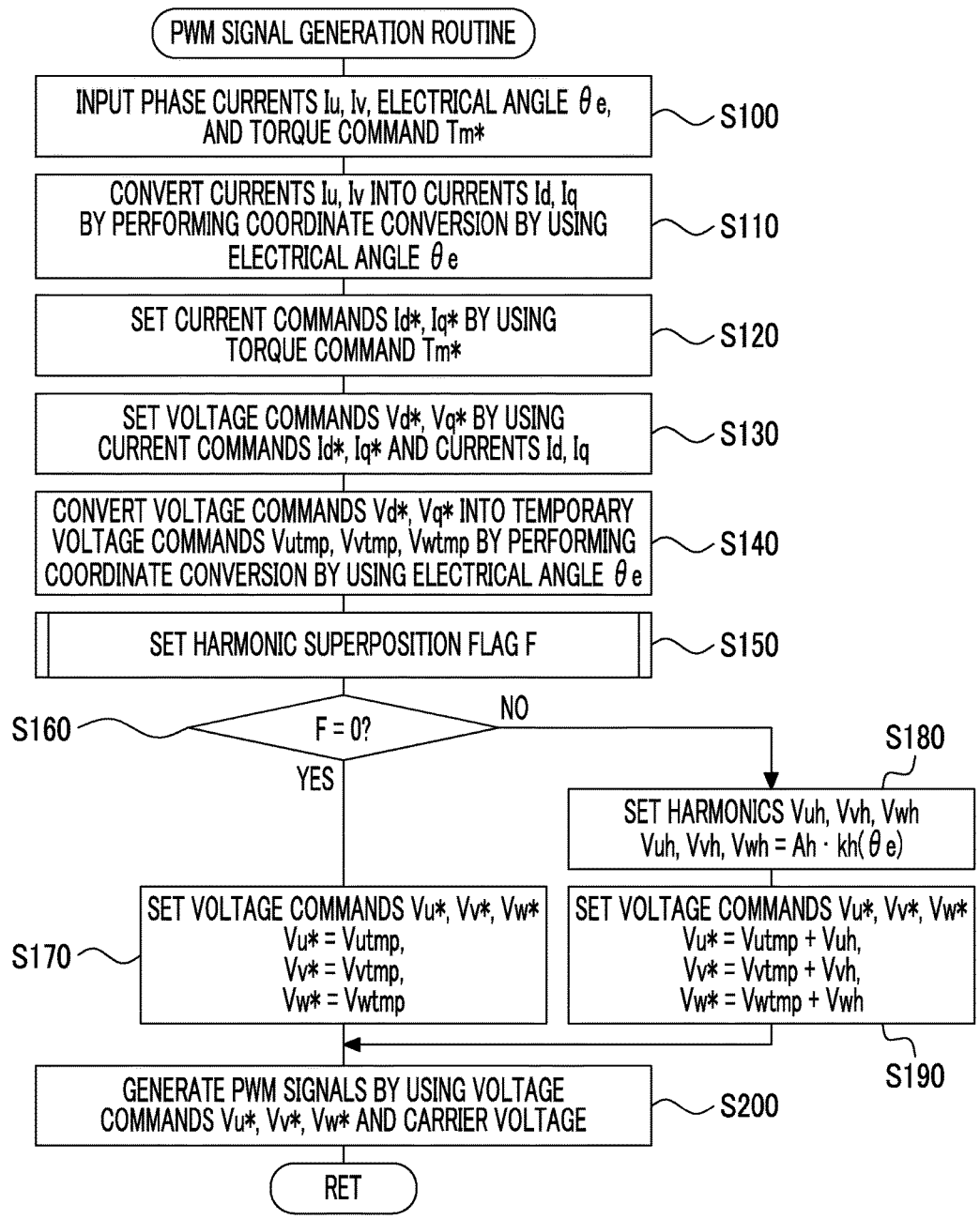
FIG. 2 is a flowchart showing an example of a PWM signal generation routine performed by an electronic control unit according to the embodiment.

An operation of the electric vehicle 20 according to the embodiment having the above-described configuration, particularly, an operation when the PWM signals used in the control of the inverter 34 are generated will be described. FIG. 2 is a flowchart showing an example of a PWM signal generation routine performed by the electronic control unit 50 according to the embodiment. The routine is repeatedly performed.

When the PWM signal generation routine is performed, the CPU 52 of the electronic control unit 50 inputs data items such as the phase currents Iu, Iv or the electrical angle θe of the motor 32 and the torque command Tm* (step S100). Values detected by the current sensors 32u, 32v are input as the phase currents Iu, Iv of the motor 32. A value calculated based on the rotation position θm of the rotor of the motor 32 detected by the rotation position detection sensor 32a is input as the electrical angle θe of the motor 32. A value set through the above-described cruise control is input as the torque command Tm* of the motor 32.

As stated above, when the data items are input, the total value of the currents flowing in the phases (U-phase, V-phase, W-phase) of the motor 32 is zero and the phase currents Iu, Iv of the U-phase, V-phase are converted into d-axis and q-axis currents Id, Iq by performing coordinate conversion (three-to-two phase conversion) by using the electrical angle θe of the motor 32 (step S110). d-axis and q-axis current commands Id*, Iq* are set based on the torque command Tm* of the motor 32 (step S120), and d-axis and q-axis voltage commands Vd*, Vq* are set by Expressions (1) and (2) by using the set d-axis and q-axis current commands Id*, Iq* and the d-axis and q-axis currents Id, Iq (step S130). In Expressions (1) and (2), "kd1", "kq1" are gains of a proportional term in feedback control, and "kd2", "kq2" are gains of an integral term in the feedback control.

$$Vd^* = kd1 \cdot (Id^* - Id) + kd2 \int (Id^* - Id) dt \quad (1)$$

$$Vq^* = kq1 \cdot (Iq^* - Iq) + kq2 \int (Iq^* - Iq) dt \quad (2)$$

The d-axis and q-axis voltage commands Vd*, Vq* are converted into temporary voltage commands Vutmp, Vvtmp, Vwtmp of the phases as temporary values of the voltage commands Vu*, Vv*, Vw* of the phases by performing coordinate conversion (two-to-three phase conversion) by using the electrical angle θe of the motor 32 (step S140). A harmonic superposition flag F is set through a flag setting process to be described below (step S150). The harmonic superposition flag F is a flag indicating a first method or a second method to be used as a method of setting the voltage commands Vu*, Vv*, Vw* of the phases. The first method is a method of setting the voltage commands Vu*, Vv*, Vw* of the phases without superposing harmonics on the temporary voltage commands Vutmp, Vvtmp, Vwtmp of the phases. The second method is a method of setting the voltage commands Vu*, Vv*, Vw* of the phases by superposing harmonics on the temporary voltage commands Vutmp, Vvtmp, Vwtmp of the phases.

The value of the harmonic superposition flag F is investigated (step S160). When the harmonic superposition flag F is 0, the electronic control unit determines that the first method is used as the method of setting the voltage commands Vu*, Vv*, Vw* of the phases, and sets the temporary voltage commands Vutmp, Vvtmp, Vwtmp of the phases as the voltage commands Vu*, Vv*, Vw* of the phases (step S170). The electronic control unit generates the PWM signals for the transistors T11 to T16 through the comparison of the set voltage commands Vu*, Vv*, Vw* of the phases with the carrier voltage (step S200), and this routine is ended. As stated above, when the PWM signals of the transistors T11 to T16 are generated, the switching control for the transistors T11 to T16 is performed by using the PWM signals.

When the harmonic superposition flag F is 1 in step S160, the electronic control unit determines that the second method is used as the method of setting the voltage commands Vu*, Vv*, Vw* of the phases, and sets superposition harmonics Vuh, Vvh, Vwh of the phases based on the electrical angle θe of the motor 32 (step S180). The electronic control unit sets the voltage commands Vu*, Vv*, Vw* of the phases by adding the set superposition harmonics Vuh, Vvh, Vwh of the phases to the temporary voltage commands Vutmp, Vvtmp, Vwtmp of the phases (step S190). The PWM signals for the transistors T11 to T16 are generated through the comparison of the set voltage commands Vu*, Vv*, Vw* of the phases with the carrier voltage (step S200), and this routine is ended.

Figure 3:
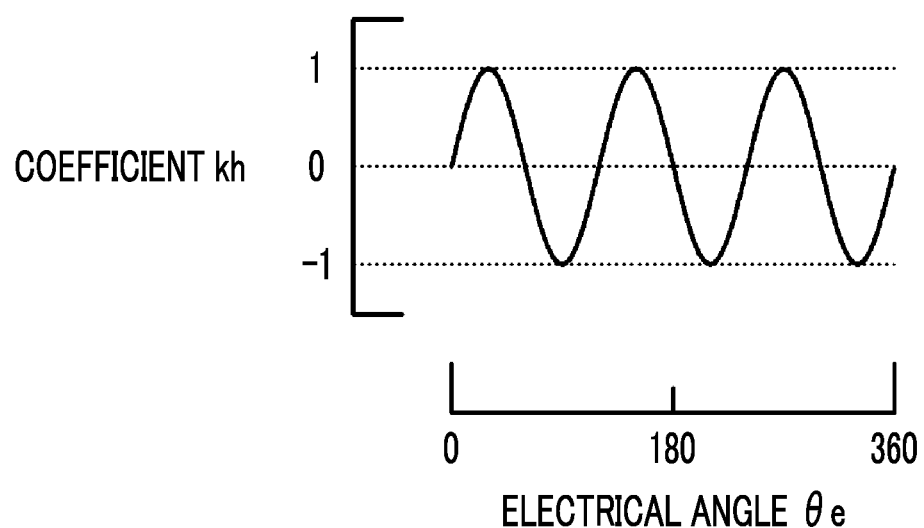
FIG. 3 is an explanatory graph showing an example of the relationship between an electrical angle of a motor and a coefficient.

A value acquired as the product of an amplitude Ah and a coefficient kh based on the electrical angle θe of the motor 32 is set as the superposition harmonics Vuh, Vvh, Vwh of the phases. Accordingly, the superposition harmonics Vuh, Vvh, Vwh of the phases are equal to each other. An example of the relationship between the electrical angle θe of the motor 32 and the coefficient kh is illustrated in FIG. 3. FIG. 3 shows a case where the order (the number of cycles per cycle of the electrical angle θe of the motor 32) of the harmonics Vuh, Vvh, Vwh is three. As shown in this graph, the coefficient kh varies sinusoidally in a range of −1 to +1 with a change of the electrical angle θe of the motor 32. Accordingly, the superposition harmonics Vuh, Vvh, Vwh of the phases vary sinusoidally in a range of −Ah to +Ah with the change of the electrical angle θe of the motor 32.

Figure 4:
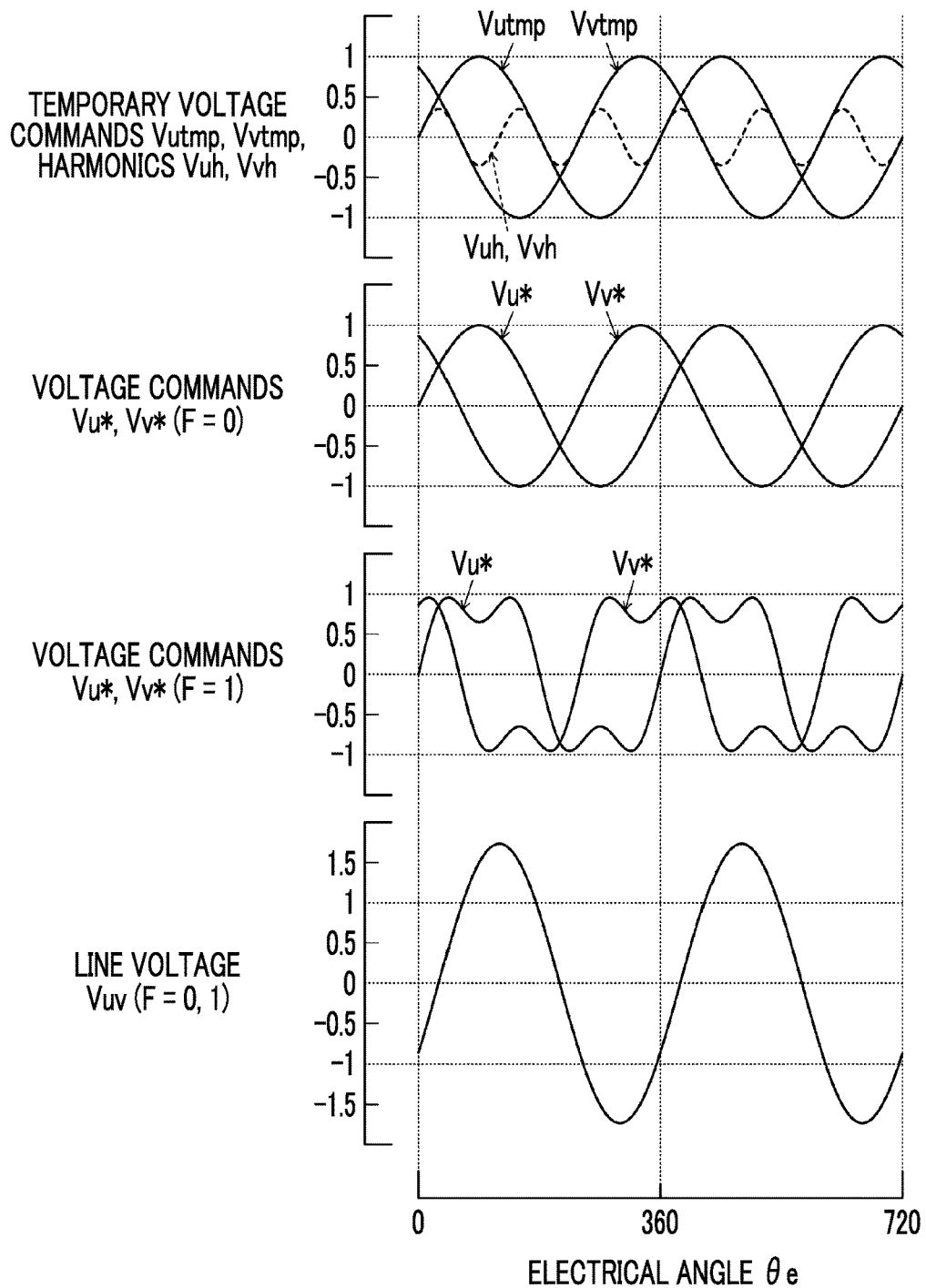
FIG. 4 is an explanatory graph showing examples of temporary voltage commands or superposition harmonic voltage commands of U-phase and V-phase and a line voltage between the U-phase and the V-phase.

FIG. 4 is an explanatory graph showing examples of temporary voltage commands Vutmp, Vvtmp or superposition harmonics Vuh, Vvh, and voltage commands Vu*, Vv* of the U-phase and V-phase, and a line voltage Vuv between the U-phase and the V-phase. In FIG. 4, the items for the W-phase are not illustrated for the sake of easiness in viewing. In this graph, scales on a vertical axis are acquired by expressing the amplitude of the temporary voltage commands Vutmp, Vvtmp as one. The first representation from the top in FIG. 4 shows the temporary voltage commands Vutmp, Vvtmp and the superposition harmonics Vuh, Vvh, the second representation from the top in FIG. 4 shows the voltage commands Vu*, Vv* when the harmonic superposition flag F is 0, the third representation from the top in FIG. 4 shows the voltage commands Vu*, Vv* when the harmonic superposition flag F is 1, and the fourth representation from the top in FIG. 4 shows the line voltage Vuv between the U-phase and the V-phase when the harmonic superposition flag F is 0 and 1.

FIG. 4 shows a case where the order n of the superposition harmonics Vuh, Vvh is constant at three, the amplitude Ah of the harmonics Vuh, Vvh is constant, and the relationship (hereinafter, referred to as a "phase relationship") between a phase θh of the harmonic Vuh and a phase θu of the temporary voltage command Vutmp of the U-phase is constant. The phase relationship will be described. The temporary voltage command Vutmp of the U-phase may be expressed by Expression (3) when the amplitude Au, the electrical angle θe of the motor 32 and a reference phase α as a phase when the electrical angle θe is zero are used. The harmonic Vuh of the U-phase may be expressed by Expression (4) when the order n, the amplitude Ah, the electrical angle θe of the motor 32, and a reference phase β are used. A value (θe+α) in Expression (3) corresponds to the phase θu of the temporary voltage command Vutmp of the U-phase, and a value (n·θe+β) in Expression (4) corresponds to a phase θh of the harmonic Vuh of the U-phase. Accordingly, the phase relationship may be considered as the relationship between the value (θe+α) and the value (n·θe+β). When both the reference phases α, β are constant, it is considered that the relationship between the value (θe+α) and the value (n·θe+β) is constant and the phase relationship is constant. FIG. 4 shows a case where the phase relationship is constant since both the reference phases α, β are constant at zero.

$$Vutmp = Au \cdot \sin(\theta e + \alpha) \quad (3)$$

$$Vuh = Ah \cdot \sin(n \cdot \theta e + \beta) \quad (4)$$

As can be seen from the second representation from the top in FIG. 4 and the third representation from the top in FIG. 4, the waveforms of the voltage commands Vu*, Vv* are different between a case where the harmonic superposition flag F is 0 and a case where the harmonic superposition flag is 1. As can be seen from the fourth representation from the top in FIG. 4, the line voltage Vuv between the U-phase and the V-phase is the same between a case where the harmonic superposition flag F is 0 and a case where the harmonic superposition flag is 1.

Figure 5:
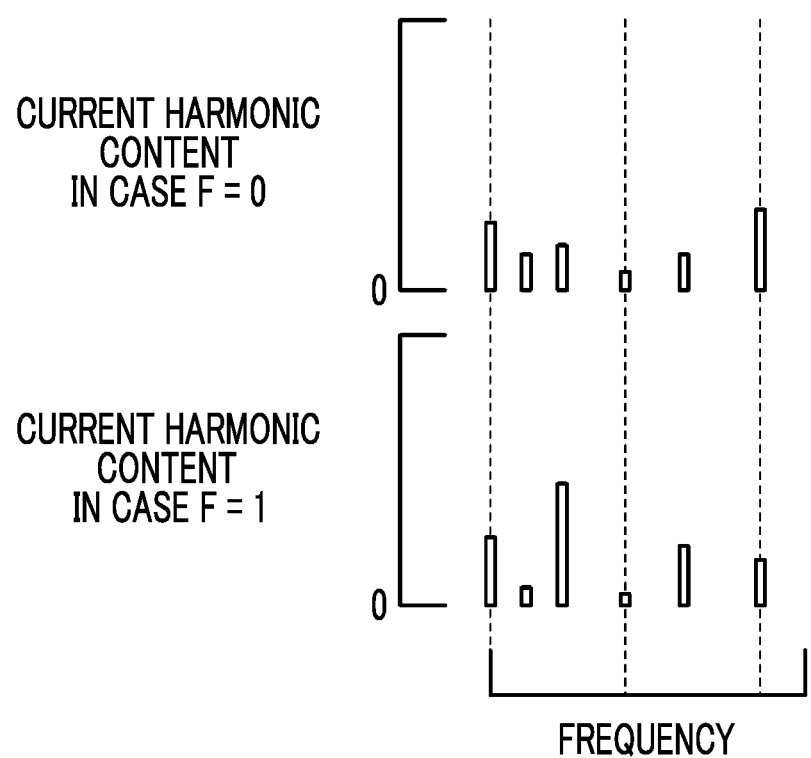
FIG. 5 is an explanatory graph showing an example of current harmonic content of each frequency (frequency order) when the inverter is controlled by using the same voltage commands of the phases as those of the second representation from the top in FIG. 4 or the third representation from the top in FIG. 4.

FIG. 5 is an explanatory graph showing an example of current harmonic content of each frequency (frequency order) when the inverter 34 is controlled by using the same voltage commands Vu*, Vv*, Vw* of the phases as those of the second representation from the top in FIG. 4 or the third representation from the top in FIG. 4. The first representation from the top in FIG. 5 shows a case where the same voltage commands Vu*, Vv*, Vw* of the phases as those of the second representation from the top in FIG. 4 are used, and the second representation from the top in FIG. 5 shows a case where the same voltage commands Vu*, Vv*, Vw* of the phases as those of the third representation from the top in FIG. 4 are used. As can be seen from the first representation from the top in FIG. 5 and the second representation from the top in FIG. 5, current harmonics to be contained (frequency (frequency order) having a high content in current harmonics) are different between a case where the harmonic superposition flag F is 0 and a case where the harmonic superposition flag F is 1. The reason is that since the waveforms of the voltage commands Vu*, Vv*, Vw* of the phases are different between a case where the harmonic superposition flag F is 0 and a case where the harmonic superposition flag is 1 (see the second representation from the top in FIG. 4 and the third representation from the top in FIG. 4), the PWM signals for the transistors T11 to T16 are different, and timings of when the transistors T11 to T16 are turned on and off are different.

A process of step S150 in the PWM signal generation routine of FIG. 2, that is, a process of setting the harmonic superposition flag F through the flag setting process of FIG. 6 will be described. In the flag setting process of FIG. 6, the CPU 52 of the electronic control unit 50 initially determines whether or not the flag setting process is an initial flag setting process in a current trip (from when ignition is turned on to when ignition is turned off) (step S300), and sets 0 as the harmonic superposition flag F, that is, uses the first method as the method of setting the voltage commands Vu*, Vv*, Vw* of the phases when the CPU determines that the flag setting process is the initial flag setting process in the current trip (step S310).

A value of one as an initial value is set to a number k (step S320), a continuous time threshold Cref is set by using the number k and a continuous time threshold table (step S330), and a continuous time counter C is reset to zero (step S340). In this case, the continuous time threshold Cref is a counter value corresponding to a time during which the harmonic superposition flag F is continued at 0 or 1 (the method of setting the voltage commands Vu*, Vv*, Vw* of the phases is continued as the first method or the second method). The continuous time table is a table representing the relationship between the number k and the continuous time threshold Cref. An example of the continuous time threshold table is illustrated in FIG. 7. As illustrated in this diagram, the continuous time threshold Cref is set so as to irregularly vary whenever the number k increments by one. The continuous time threshold Cref may be set by applying the number k to the continuous time threshold table. The continuous time counter C is a counter value corresponding to a time elapsing from when the harmonic superposition flag F is set or is switched in the initial flag setting process. When the CPU determines that the flag setting process is not the initial flag setting process in the current trip in step S300, the processes of steps S310 to S340 are not performed.

The continuous time counter C increments by one (step S350), and the continuous time counter C is compared with the continuous time threshold Cref (step S360). The harmonic superposition flag F is held when the continuous time counter C is less than the continuous time threshold Cref (step S370), and the flag setting process is ended.

When the continuous time counter C is equal to or greater than the continuous time threshold Cref in step S360, the present value of the harmonic superposition flag F is investigated (step S380). When the present value of the harmonic superposition flag F is 0, the harmonic superposition flag F is switched to 1 (step S390). Meanwhile, when the present value of the harmonic superposition flag F is 1, the harmonic superposition flag F is switched to 0 (step S400). The processes of steps S380 to S400 are processes of switching the method of setting the voltage commands Vu*, Vv*, Vw* of the phases between the first method and the second method.

The number k is incremented by one and is updated (step S410), and the continuous time threshold Cref is set by using the number k and the continuous time threshold table (see FIG. 7) similarly to the processes of steps S330 and S340 (step S420). The continuous time counter C is reset to zero (step S430), and the flag setting process is ended.

Figure 6:
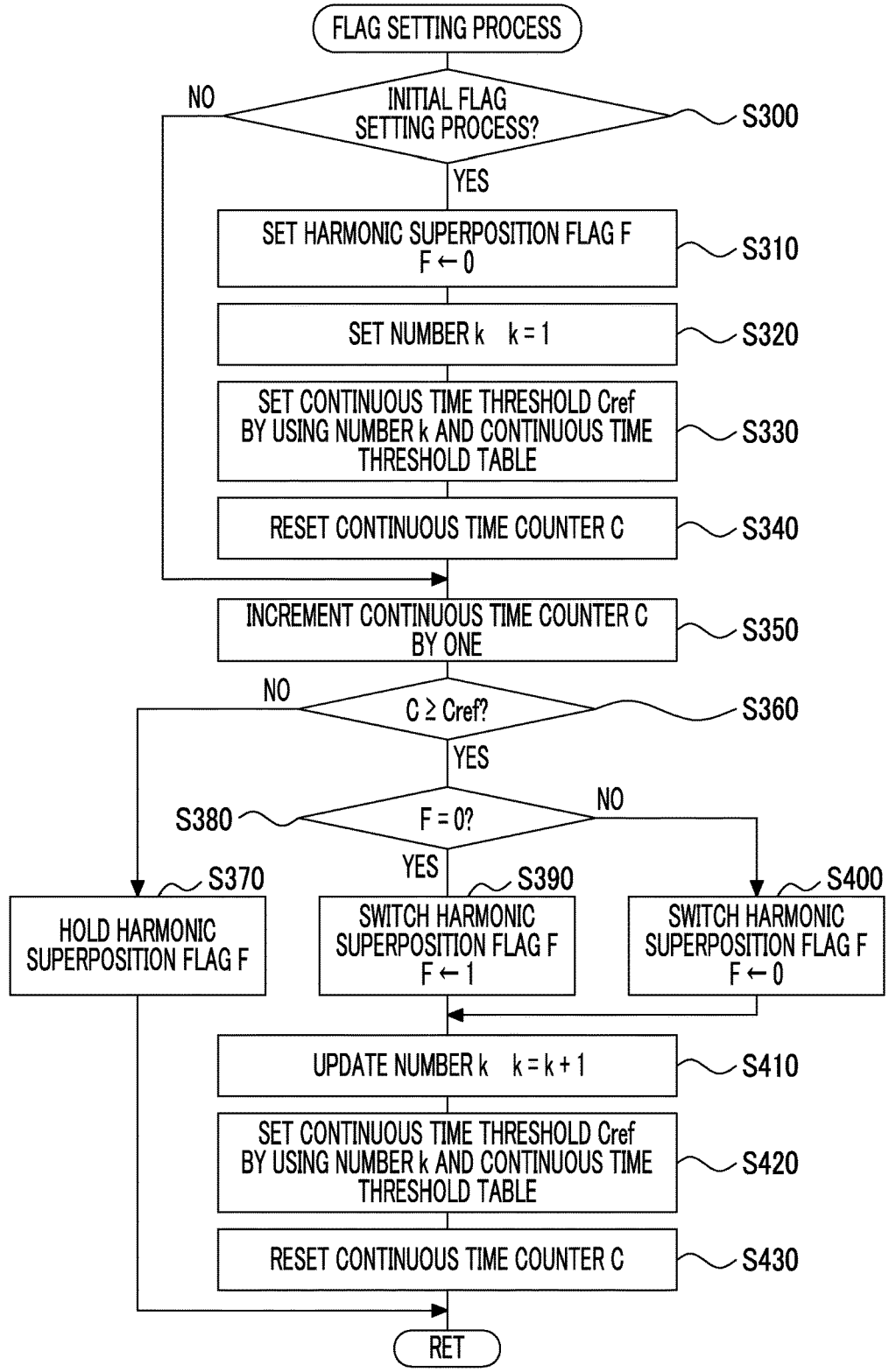
FIG. 6 is a flowchart showing an example of a flag setting process.

Through the flag setting process of FIG. 6, the harmonic superposition flag F (the method of setting the voltage commands Vu*, Vv*, Vw* of the phases) is switched for each interval of the continuous time threshold Cref which irregularly varies. As mentioned above, the timings of when the transistors T11 to T16 are turned on and off are different between the first method and the second method, and the current harmonics to be contained (frequency (frequency order) having a high content in current harmonics) are different. Accordingly, the current harmonics to be contained can vary (spread) for each irregular time interval by switching the harmonic superposition flag F for each interval of the continuous time threshold Cref which irregularly varies, and thus, it is possible to further reduce noise caused by electromagnetic sound.

In the driving device provided in the electric vehicle 20 according to the embodiment described above, the method of setting the voltage commands Vu*, Vv*, Vw* of the phases is switched between the first method of setting the voltage commands Vu*, Vv*, Vw* of the phases without superposing the harmonics to the temporary voltage commands Vutmp, Vvtmp, Vwtmp of the phases and the second method of setting the voltage commands Vu*, Vv*, Vw* of the phases by superposing the harmonics to the temporary voltage commands Vutmp, Vvtmp, Vwtmp of the phases for each irregular time interval. Accordingly, the current harmonics to be contained (frequency (frequency order) having a high content in current harmonics) can vary (spread) for each irregular time interval, and thus, it is possible to further reduce noise caused by electromagnetic sound. The method of setting the voltage commands Vu*, Vv*, Vw* of the phases may be switched through any of synchronous PWM control and asynchronous PWM control.

Figure 8:
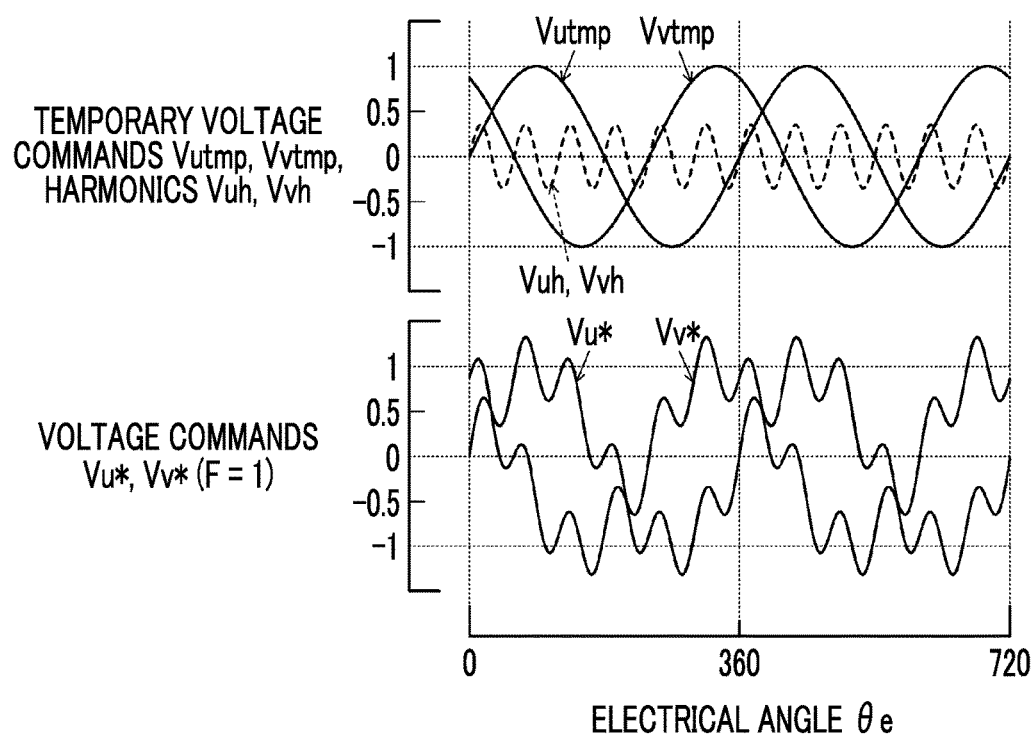
FIG. 8 is an explanatory graph showing examples of temporary voltage commands or superposition harmonics and voltage commands of U-phase and V-phase according to a modification example.

In the driving device provided in the electric vehicle 20 according to the embodiment, when the second method is used as the method of setting the voltage commands Vu*, Vv*, Vw* of the phases, the order n of the superposition harmonics Vuh, Vvh, Vwh of the phases is three. However, when the order n is a multiple of three, the order is not limited to three, and may be, for example, six or nine. Examples of the temporary voltage commands Vutmp, Vvtmp or the superposition harmonics Vuh, Vvh and the voltage commands Vu*, Vv* of the U-phase and V-phase when the order n of the superposition harmonics Vuh, Vvh, Vwh is six are shown in FIG. 8. The first representation from the top in FIG. 8 shows the temporary voltage commands Vutmp, Vvtmp and the superposition harmonics Vuh, Vvh, and the second representation from the top in FIG. 8 shows the voltage commands Vu*, Vv* when the harmonic superposition flag F is 1. It can be seen that the waveforms of the voltage commands Vu*, Vv* are different through the comparison of the second representation from the top in FIG. 8 with the third representation from the top in FIG. 4. Thus, between both these graphs, the PWM signals for the transistors T11 to T16 are different, the timings of when the transistors T11 to T16 are turned on and off are different, and the current harmonics to be contained (frequency (frequency order) having a high content in current harmonics) are different.

In the driving device provided in the electric vehicle 20 according to the embodiment, when the second method is used as the method of setting the voltage commands Vu*, Vv*, Vw* of the phases, the order n of the superposition harmonics Vuh, Vvh, Vwh of the phases is constant at three. However, the order n may be variable. In this case, the order n may vary (for example, 3, 6, 9, 3, 6, 9, . . . ) with predetermined regularity or may irregularly vary (for example, 3, 6, 3, 9, 6, . . . ) whenever the method of setting the voltage commands Vu*, Vv*, Vw* of the phases is switched from the first method to the second method. The order n may vary depending on the amplitude of the temporary voltage commands Vutmp, Vvtmp, Vwtmp of the phases or a modulation index Rm. The modulation index Rm is a ratio of a root mean square of an output voltage (an applied voltage of the motor 32) to an input voltage (a voltage VH of the high voltage side power line 42) of the inverter 34. When the order n is variable, the current harmonics to be contained (frequency (frequency order) having a high content in current harmonics) can further spread, and thus, it is possible to further reduce noise caused by electromagnetic sound.

In the driving device provided in the electric vehicle 20 according to the embodiment or the modification examples described above, the order n of the superposition harmonics is a multiple of three such as three, six, and nine. However, the order n may not be a multiple of three, and may be two, four, or five.

In the driving device provided in the electric vehicle 20 according to the embodiment, when the second method is used as the method of setting the voltage commands Vu*, Vv*, Vw* of the phases, the amplitude Ah of the superposition harmonics Vuh, Vvh, Vwh of the phases is constant. However, the amplitude Ah may be variable. In this case, the amplitude Ah may vary with predetermined regularity or may irregularly vary whenever the method of setting the voltage commands Vu*, Vv*, Vw* of the phases is switched from the first method to the second method. The amplitude Ah may vary depending on the amplitude of the temporary voltage commands Vutmp, Vvtmp, Vwtmp of the phases or the modulation index Rm. When the amplitude Ah is variable, the current harmonics to be contained (frequency (frequency order) having a high content in current harmonics) can further spread and thus, it is possible to further reduce noise caused by electromagnetic sound.

Figure 9:
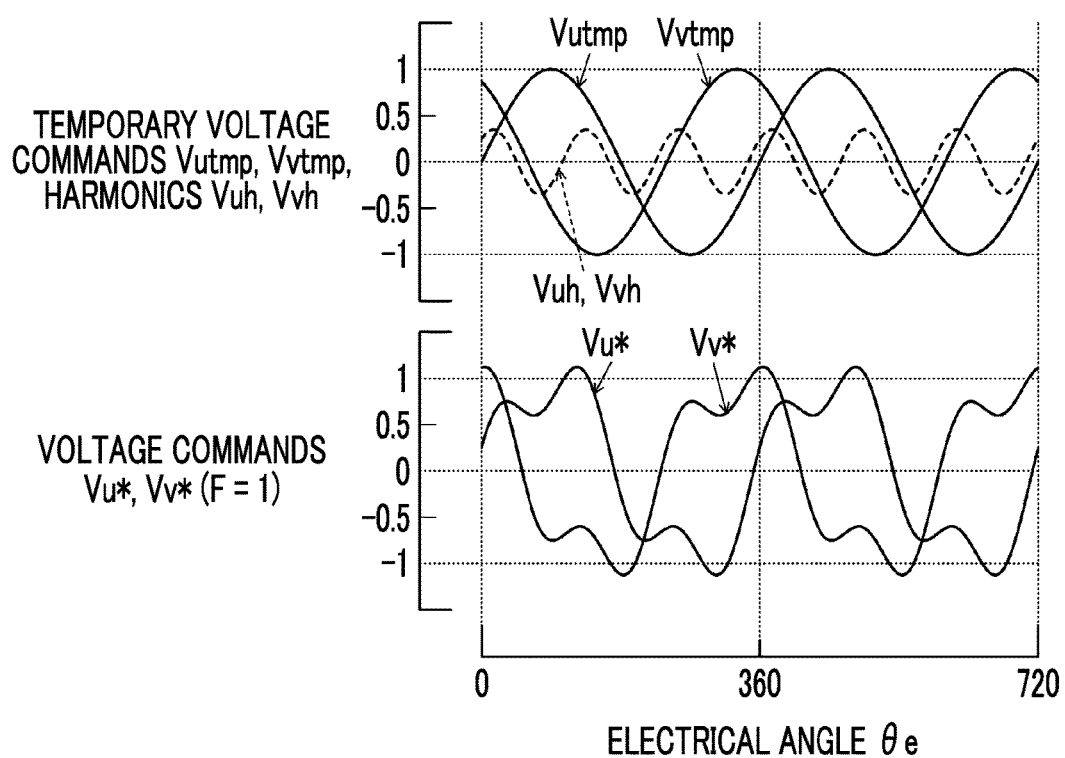
FIG. 9 is an explanatory graph showing examples of temporary voltage commands or superposition harmonics and voltage commands of U-phase and V-phase according to a modification example.

In the driving device provided in the electric vehicle 20 according to the embodiment, when the second method is used as the method of setting the voltage commands Vu*, Vv*, Vw* of the phases, both the reference phases α and β are constant at zero as shown in FIG. 4, and thus, the phase relationship is constant. However, one of the reference phases α, β is constant at zero and the other one is constant at a value other than zero, and thus, the phase relationship may be constant. Alternatively, both the reference phases α, β are constant at a value other than zero and are equal to each other or different from each other, and thus, the phase relationship may be constant. Examples in which the temporary voltage commands Vutmp, Vvtmp or the superposition harmonics Vuh, Vvh and the voltage commands Vu*, Vv* of the U-phase and the V-phase in a case where the reference phase α is constant at zero and the reference phase β is constant at a value other than zero, and thus, the phase relationship is constant are illustrated in FIG. 9. The first representation from the top in FIG. 9 shows the temporary voltage commands Vutmp, Vvtmp and the superposition harmonics Vuh, Vvh, and the second representation from the top in FIG. 9 shows the voltage commands Vu*, Vv* when the harmonic superposition flag F is 1. It can be seen that the waveforms of the voltage commands Vu*, Vv* are different through the comparison of the second representation from the top in FIG. 9 with the third representation from the top in FIG. 4. Thus, between both these graphs, the PWM signals for the transistors T11 to T16 are different, the timings of when the transistors T11 to T16 are turned on and off are different, and the current harmonics to be contained (frequency (frequency order) having a high content in current harmonics) are different.

In the driving device provided in the electric vehicle 20 according to the embodiment, when the second method is used as the method of setting the voltage commands Vu*, Vv*, Vw* of the phases, the phase relationship is constant. However, the phase relationship may be variable. In this case, the phase relationship may vary with predetermined regularity or may irregularly vary whenever the method of setting the voltage commands Vu*, Vv*, Vw* of the phases is switched from the first method to the second method. The phase relationship may vary depending on the amplitude of the temporary voltage commands Vutmp, Vvtmp, Vwtmp of the phases or the modulation index Rm. When the phase relationship is variable, the current harmonics to be contained (frequency (frequency order) having a high content in current harmonics) can further spread and thus, it is possible to further reduce noise caused by electromagnetic sound.

In the driving device provided in the electric vehicle 20 according to the embodiment, when the continuous time counter C is equal to or greater than the continuous time threshold Cref, the harmonic superposition flag F is switched (the method of setting the voltage commands Vu*, Vv*, Vw* is switched). Thereafter, the number k is incremented by one and is updated and the continuous time threshold Cref is set (updated) by using the updated number k and the continuous time threshold table. However, when the continuous time counter C is equal to or greater than the continuous time threshold Cref, the harmonic superposition flag F may be switched, and the continuous time threshold Cref may be randomly set (updated) (by using a random number generator that generates random numbers in real time) without using the number k or the continuous time threshold table.

Although the boost converter 40 is provided between the battery 36 and the inverter 34 in the driving device provided in the electric vehicle 20 according to the embodiment, the boost converter 40 may not be provided.

In the embodiment, the configuration of the driving device provided in the electric vehicle 20 is used. However, the driving device may include the motor and the inverter, and the driving device may be provided in a hybrid vehicle or may be provided in unmovable equipment such as construction equipment.

In the embodiment, the motor 32 is an example of a "motor", the inverter 34 is an example of an "inverter", and the electronic control unit 50 is an example of a "electronic control unit".

While the mode for carrying out the present disclosure has been described in conjunction with the embodiment, the present disclosure is not limited to the above-described embodiment, and the present disclosure may be carried out in various forms without departing from the gist of the present disclosure.

The present disclosure is applicable to the manufacturing industry of the driving device.

What is claimed is:

1. A driving device comprising:
   a motor;
   an inverter configured to drive the motor by switching a plurality of switching elements; and
   an electronic control unit configured to determine temporary voltage commands of phases of the motor based on a torque command of the motor, set voltage commands based on the temporary voltage commands by switching a method of setting the voltage commands between a first method and a second method at irregular time intervals, and generate pulse width modulation (PWM) signals to perform switching control on the plurality of switching elements, based on the voltage commands and a carrier voltage, wherein:
   the first method is a method of setting the voltage commands as the temporary voltage commands; and
   the second method is a method of setting the voltage commands as results of superposing harmonics onto the temporary voltage commands.

2. The driving device according to claim 1, wherein an order of the harmonics is a multiple of three.

3. The driving device according to claim 1, wherein an order of the harmonics is constant.

4. The driving device according to claim 1, wherein an order of the harmonics is variable.

5. The driving device according to claim 1, wherein an amplitude of the harmonics is constant.

6. The driving device according to claim 1, wherein an amplitude of the harmonics is variable.

7. The driving device according to claim 1, wherein a relationship between a phase of the temporary voltage commands and a phase of the harmonics is constant.

8. The driving device according to claim 1, wherein a relationship between a phase of the temporary voltage commands and a phase of the harmonics is variable.

9. The driving device according to claim 1, wherein:
   the electronic control unit is configured to switch the method of setting the voltage commands whenever a continuous time in the first method or the second method of the method of setting the voltage commands is equal to or greater than a threshold; and
   the electronic control unit is configured to switch the method of setting the voltage commands for each irregular time interval by updating the threshold with an irregular value.

10. The driving device according to claim 9, wherein:
    the electronic control unit has a table for determining a threshold of the continuous time;
    a number and the threshold of the continuous time are set in the table; and
    the electronic control unit is configured to count the number whenever the continuous time in the first method or the second method is equal to or greater than the threshold and set the threshold of the continuous time corresponding to the number in the table as a new continuous time threshold.

11. The driving device according to claim 9, wherein the electronic control unit is configured to set a new continuous time threshold by using a random number generator whenever the continuous time in the first method or the second method is equal to or greater than the threshold.

* * * * *